United States Patent [19]

Kanbara et al.

[11] Patent Number: 5,616,274
[45] Date of Patent: Apr. 1, 1997

[54] ION-CONDUCTIVE POLYMER ELECTROLYTE AND ELECTROLYTIC CAPACITOR USING THE SAME

[75] Inventors: Teruhisa Kanbara, Ikeda; Yuichiro Tsubaki, Uji; Kenichi Takeyama, Osaka, all of Japan

[73] Assignee: Matsushita Electric Industrial Co., Ltd., Osaka, Japan

[21] Appl. No.: 324,521

[22] Filed: Oct. 18, 1994

[30] Foreign Application Priority Data

Oct. 19, 1993 [JP] Japan .................................. 5-260993

[51] Int. Cl.$^6$ .......................... H01G 9/028; H01G 9/035
[52] U.S. Cl. ...................... 252/62.2; 429/192; 429/189; 429/194; 429/191; 429/201; 429/198; 361/505; 361/509; 361/525; 361/527; 361/529
[58] Field of Search .......................... 252/62.2; 429/192, 429/189, 194, 191, 201, 198; 361/524, 525, 527, 528, 529, 523, 505, 509, 503

[56] References Cited

U.S. PATENT DOCUMENTS

| | | | |
|---|---|---|---|
| 4,908,283 | 3/1990 | Takahashi et al. | 429/192 |
| 4,970,012 | 11/1990 | Kuroda et al. | 429/192 |
| 5,071,521 | 12/1991 | Kojima et al. | 205/153 |
| 5,086,374 | 2/1992 | MacFarlane et al. | 361/525 |
| 5,153,820 | 10/1992 | MacFarlane et al. | 361/525 |
| 5,159,001 | 10/1992 | Motogami et al. | 524/157 |
| 5,275,750 | 1/1994 | Sato et al. | 252/62.2 |
| 5,356,553 | 10/1994 | Kono et al. | 252/62.2 |
| 5,436,090 | 7/1995 | Kono et al. | 429/192 |
| 5,526,224 | 6/1996 | Kanbara et al. | 252/62.2 |

FOREIGN PATENT DOCUMENTS

| | | |
|---|---|---|
| 2076947 | 4/1993 | Canada . |
| 1309205 | 12/1989 | Japan . |
| 2105855 | 4/1990 | Japan . |
| 2138364 | 5/1990 | Japan . |

OTHER PUBLICATIONS

Patent Abstracts of Japan, No. 383, E–1116, Sep. 1991.
Patent Abstracts of Japan, No. 323, E–1101, Aug. 1991.
Patent Abstracts of Japan, No. 334, E–1104, Aug. 1991.

*Primary Examiner*—Alan D. Diamond
*Attorney, Agent, or Firm*—Cushman Darby & Cushman IP Group of Pillsbury Madison & Sutro LLP

[57] ABSTRACT

A stable ion-conductive polymer electrolyte for an electrolytic capacitor comprises: a polymer made up of a prepolymer which has a polyol skeletal structure including polyalkylene oxide units, at least one ammonium salt, and at least one organic solvent. The skeletal structure is exemplified as trimethylol propane, trimethylolol ethane or tetramethylol methane.

11 Claims, 6 Drawing Sheets

ION-CONDUCTIVE POLYMER ELECTROLYTE AND ELECTROLYTIC CAPACITOR USING THE SAME

BACKGROUND OF THE INVENTION

1. Field of the Invention

The present invention relates to an ion-conductive polymer electrolyte and an aluminum electrolytic capacitor configured with the same electrolyte as an electrolyte for driving the electrolytic capacitor.

2. Description of the Prior Art

Conventionally, as an electrolyte for driving an aluminum electrolytic capacitor, a solution prepared by dissolving an ammonium salt in an organic solvent having a high dielectric constant such as ethylene glycol has been used. However, there has been a possibility of leakage and evaporation of the electrolyte in the capacitor when such liquid electrolyte is used, and hence it has been impossible to obtain a reliability in operation for a long period of time.

In order to solve these problems, there has been proposed an electrolytic capacitor that is free from the leakage and evaporation of the electrolyte. Such a capacitor is configured by solidifying its capacitor element as a result of employing an ion-conductive polymer electrolyte composed of a mixture of siloxane-alkylene oxide copolymer and polyethylene oxide, as its prepolymer, and an alkali metal salt, instead of the liquid electrolyte.

However, the electrolytic capacitor using, as its electrolyte, the ion-conductive polymer electrolyte with alkali metal ions as its mobile ions has such a disadvantage that the alkali metal ions are liable to diffuse into a dielectric substance layer formed on a positive electrode of the electrolytic capacitor, and the thus diffused alkali metal ions might sometimes cause a lowering of the dielectric constant of the dielectric substance layer, and finally invite a short-circuit in the capacitor.

In order to overcome such disadvantages and deficiencies, it has been considered to use ammonium ions in place of the alkali metal ions which had been used as the mobile ions of the electrolyte constituting the electrolytic capacitor. However, it has hitherto been known that the ion-conductive polymer electrolyte which contains the ammonium ions has a very low ionic conductivity in general.

The ionic conductivity of the electrolyte constituting the electrolytic capacitor acts as an impedance of the capacitor, and when the ion conductivity of the electrolyte is too small, the impedance of the capacitor becomes large and it is difficult to use in practical point of view.

In order to enable an employment of such ion-conductive polymer electrolyte as the electrolyte for driving an electrolytic capacitor, it is an essential factor to clarify a suitable combination of various polymer mother ingredients (prepolymers) with ammonium salts for realizing an electrolyte of high ionic conductivity, but no concrete example has been clarified.

In addition, the application of the aluminum electrolytic capacitor has recently been expanded widely, and its long-term reliability during high-temperature storing has been attracting attention. For instance, a guarantee for its quality in the continuous exposure to a high temperature at 105° C. for 10,000 hours, for instance, is now required to be accepted by the current market. When the polymer electrolytes were exposed to such a high temperature atmosphere, a physical and/or chemical deterioration such as cracks, contraction or dissolution (liquefaction) may be produced, and thus the exposure may cause a serious deterioration in the characteristics of the capacitor element. A solid phase electrolyte which does not suffer from any deterioration in its performance for such severe test environments has not been proposed yet.

SUMMARY OF THE INVENTION

It is therefore a primary object of the present invention to provide a stable polymer electrolyte having a sufficiently high ionic conductivity, which will not be decreased during storing at a high temperature for a long period.

It is another object of the present invention to provide an electrolytic capacitor configured with the polymer electrolyte.

An ion-conductive polymer electrolyte in accordance with the present invention comprises: a polymer polymerized from a prepolymer which has a polyol skeletal structure including at least three polyalkylene oxide units, at least one ammonium salt and at least one organic solvent.

In this ion-conductive polymer electrolyte, the polyol moiety of the above-mentioned prepolymer is a compound represented by the general formula:

$$R_4-\underset{\underset{CH_2-R_3-X}{|}}{\overset{\overset{CH_2-R_1-X}{|}}{C}}-CH_2-R_2-X \quad (1)$$

(wherein $R_i$ (i=1, 2, 3)=—O—[$(C_2H_4O)_{1_i}$—$(C_3H_6O)_{m_i}$]$_{n_i}$—, $R_4$=—$CH_3$, —$C_2H_5$ or —$CH_2$—O—[$(C_2H_4O)_{1_4}$—$(C_3H_6O)_{m_4}$]$_{n_4}$—X, $1_i$, $m_1$ and $n_i$ (i=1, 2, 3, 4) are 1 or larger integers, and X represents a terminal group having at least one double bond at which a polymerization of the prepolymer can be initiated), or a polyglyceride represented by the general formula:

(wherein $R_1$=—O—[$(C_2H_4O)_{1_1}$—$(C_3H_6O)_{m_1}$]—,
$R_2$=—O—[$(C_2H_4O)_{1_2}$—$(C_3H_6O)_{m_2}$]$_{n_2}$—,
$R_3$=—O—[$(C_3H_4O)_{1_3}$—$(C_3H_6O)_{m_3}$]$_{n_3}$—, $1_i$, $m_i$ and $n_i$ (i=1, 2, 3) are 1 or larger integers, j represents 2 or larger integers, and X represents a terminal group having at least one double bond at which a polymerization of the prepolymer can be initiated).

DESCRIPTION OF THE PREFERRED EMBODIMENTS

In the following paragraphs, the embodiments of the ion-conductive polymer electrolyte and the electrolytic capacitor prepared by using the same will be described in detail.

In an embodiment of the present invention, the polyol moiety of the above-mentioned prepolymer has a skeletal structure of trimethylol propane of the formula:

(wherein $R_i$ (i=1, 2, 3)=—O—$[(C_2H_4O)_{1_i}$—$(C_3H_6O)_{m_i}]_{n_i}$— and X represents a terminal group having at least one double bond at which a polymerization of the prepolymer can be initiated), or of trimethylol ethane of the formula:

(wherein $R_i$ (i=1, 2, 3)=—O—$[(C_2H_4O)_{1_i}$—$(C_3H_6O)_{m_i}]_{n_i}$—, and X represents a terminal group having at least one double bond at which a polymerization of the prepolymer can be initiated).

In another embodiment of the present invention, the polyol moiety of the above-mentioned prepolymer has a skeletal structure of tetramethylol methane of the formula:

(wherein $R_i$ (i=1, 2, 3, 4)=—O—$[(C_2H_4O)_{1_i}$—$(C_3H_6O)_{m_i}]_{n_i}$— and X represents a terminal group having at least one double bond at which a polymerization of the prepolymer can be initiated).

The above-mentioned polyalkylene oxide in the prepolymer employed in the present invention is a copolymer of ethylene oxide and propylene oxide, and a preferable ratio of the number for the ethylene oxide (EO) unit to the total number for the ethylene oxide (EO) unit and the propylene oxide (PO) unit included in one branch in the above-mentioned structural formulae is 50% or more. And the number (1×n) for the ethylene oxide (EO) unit included in one branch is preferably in a range between 2 and 20.

The ion-conductive polymer electrolyte in accordance with the present invention is a cross-linked polymer of the above-mentioned prepolymer, which has finally been produced by allowing the prepolymer to be cross-linked at the terminal group X of the prepolymer as a result of curing with an irradiation of an active ultraviolet ray or electron beam or heating. As the terminal group X, it is preferable to employ one of acryloyl group (—CO—CH=CH$_2$) or methacryloyl group (—CO—C(CH$_3$)=CH$_2$).

The ammonium salt employed in the ion-conductive polymer electrolyte in accordance with the present invention is preferably at least one member selected from the group consisting of an ammonium salt and a quaternary ammonium salt of a carboxylic acid or dicarboxylic acid.

It is preferable to use a tetraalkyl ammonium salt containing from 1 to 4 carbon atoms as the quaternary ammonium salt.

As the carboxylic and dicarboxylic acid, it is preferable to use at least one member selected from the group consisting of oxalic acid, adipic acid, azelaic acid, benzoic acid, formic acid, citric acid, succinic acid, salicylic acid, tartaric acid, sebacic acid, 2-butyloctanedioic acid, p-nitrobenzoic acid, phthalic acid, borodisalicylic acid, maleic acid, γ-resorcylic acid and lactic acid.

As the organic solvent employed for preparing the ion-conductive polymer electrolyte of the present invention, it is preferable to use: at least one member selected from the group consisting of ethylene glycol, diethylene glycol, triethylene glycol, and tetraethylene glycol; at least one member selected from the group consisting of triethylene glycol monomethyl ether and tetraethylene glycol monomethyl ether; or at least one member selected from the group consisting of γ-butyrolactone, propylene carbonate, ethylene carbonate, sulfolane, N,N-diformamide, dimethylsulfoxide and acetonitrile.

It is preferable to use these solvents in the ion-conductive polymer electrolyte in a proportion ranging from 10% to 90% by weight.

The electrolytic capacitor of the present invention comprises: a positive electrode made of aluminum having a dielectric substance layer of aluminum oxide, a negative electrode made of aluminum, and an ion-conductive polymer electrolyte placed between the dielectric substance layer and the negative electrode.

The above-mentioned ion-conductive polymer electrolyte comprising a prepolymer for a high molecular compound, having a skeletal structure of polyol and including polyalkylene oxides therein, an ammonium salt and an organic solvent, has a sufficiently high ionic conductivity; and the ion-conductive polymer electrolyte does not suffer from a deterioration in the conductivity even after storing at a high temperature for a long period of time, a physical change such as cracks, contraction and dissolution. Therefore the electrolyte is particularly suitable for driving an aluminum electrolytic capacitor.

Further, by making the polyalkylene oxide in the prepolymer a copolymer of ethylene oxide and propylene oxide, it is possible to realize an improvement in the ionic conductivity. Moreover, by forming a three-dimensionally cross-linked structure at double bond-parts of the terminal groups X, it is possible to improve a physical strength of the polymer electrolyte in a film or sheet state.

This advantage is particularly prominent if a prepolymer whose polyol skeletal structure is one of polyglyceride, trimethylol propane, trimethylol ethane or tetramethylol methane represented by the formulae: (1) and (2). In this case, any of the polyols having an acryloyl group or methacrylolyl group as its terminal group is particularly excellent. As the ammonium salt to be used with this polyol, the above-mentioned ammonium salts are chemically stable and have a sufficiently high ionic conductivity.

Since any of the above-mentioned organic solvents, i.e., ethylene glycol, diethylene glycol, triethylene glycol and tetraethylene glycol has a plurality of hydroxyl groups at their ends, they have a function of dissolving the above-mentioned ammonium salts of the carboxylic acid or dicarboxylic acid In large quantities, and another function of dissociating the salt into ion pairs. For this reason, as a result of incorporating these solvents in the prepolymers as a plasticizer, it is possible to improve its conductivity in great deal.

Further, any of the above-mentioned organic solvents, i.e., γ-butyrolactone, propylene carbonate, ethylene carbonate, sulfolane, N,N-diformamide, dimethylsulfoxide and acetonitrile, has a high dielectric constant and a function of dissolving particularly the above-mentioned quaternary ammonium salts of the carboxylic acid and dicarboxylic acid in large quantities and dissociating the salts to ion pairs. For this reason, as a result of incorporating these solvents in the prepolymers as a plasticizer, it is possible to improve its conductivity in great deal.

Moreover, any of the above-mentioned organic solvents, i.e., triethylene glycol monomethyl ether and tetraethylene glycol monomethyl ether has a function of dissolving particularly the above-mentioned ammonium salts and quaternary ammonium salts of the borodisalicylic acid and γ-resorcylic acid in large quantities and dissociating the salts to ion pairs. For this reason, as a result of incorporating these solvents in the prepolymers as a plasticizer, it is possible to improve its conductivity in great deal. Further, since these solvents have a high boiling point and a low vapor pressure, they have a remarkable reliability during storing at high temperature for a long period of time.

As will be made apparent from the following detailed description on the invention, a stable polymer electrolyte having a sufficiently high ionic conductivity, which will not be decreased during storing at a high temperature for a long period, will be obtained as a result of embodying the present invention.

While novel features of the invention are set forth in the preceding, the invention, both as to organization and content, can be further understood and appreciated, along with other objects and features thereof, from the following detailed description and examples when taken in conjunction with the appended drawings.

EXAMPLE 1

A description will now be made on the ionic conductivity and reliability for storing at a high temperature of the electrolyte prepared with a polymer made up of prepolymers of the compound represented by the formula (2), wherein j represents 2, and the terminal group X is an acryloyl group.

First, a solution was prepared by dissolving 20 g of ammonium 2-butyloctanedioate in 80 g of ethylene glycol.

Next, to this solution, added were 20 g of each of the prepolymers of the compounds represented by the formula (2), wherein the number 1×n for the ethylene oxide unit (EO) and that m×n for the propylene oxide unit (EO) included in one branch (unit numbers) are adjusted as listed after sample numbers in Table 1 below, as well as 20 mg of benzyldimethyl ketal as a cross-linking initiator. And the obtained mixture was stirred well to dissolve the additives. Each of the mixtures was spread over a stainless steel tray in a thickness of 0.5 mm and irradiated by a high pressure mercury lamp having an intensity of 100 mJ under a nitrogen atmosphere to obtain an ion-conductive polymer electrolyte sheet.

Ionic conductivities at 20° C. of the electrolyte sheets prepared in the above-mentioned manner were measured by a known complex impedance method and the results of the measurements are summarized in Table 1.

Further, deformations and volumetric contractions of the electrolytes were also measured and observed after storing them at a high temperature, for evaluating the suitable numbers of the ethylene oxide unit and the propylene oxide unit included in the prepolymer which are practical with respect to the heat-resistant property. The results of the measurements are also summarized in Table 1. In the measurement, the evaluations on the deformations and volumetric contractions of the electrolytes were performed by finishing the polymer electrolyte sheets to have a disk shape of a thickness of 0.5 mm and a diameter of 13 mm, which had then been stored in air at 105° C. for 24 hours. And the outer shapes were observed and the decreasing rate was measured for the diameter of each of the polymer electrolyte sheet disks after the storing.

TABLE 1

| Sample No. | Unit number | | Conductivity | Outer diameter maintenance |
|---|---|---|---|---|
| | EO | PO | (S/cm) | rate (%) |
| 1-1 | 2 | 1 | Not cured | — |
| 1-2 | 4 | 2 | $1.0 \times 10^{-3}$ | cracks developed |
| 1-3 | 6 | 3 | $1.2 \times 10^{-3}$ | 99 |
| 1-4 | 8 | 3 | $1.8 \times 10^{-3}$ | 98 |
| 1-5 | 8 | 4 | $1.5 \times 10^{-3}$ | 95 |
| 1-6 | 8 | 8 | $0.8 \times 10^{-3}$ | 93 |
| 1-7 | 8 | 16 | $0.1 \times 10^{-3}$ | 90 |
| 1-8 | 10 | 5 | $2.0 \times 10^{-3}$ | 93 |
| 1-9 | 12 | 4 | $3.0 \times 10^{-3}$ | 92 |
| 1-10 | 12 | 6 | $2.0 \times 10^{-3}$ | 91 |
| 1-11 | 12 | 12 | $1.0 \times 10^{-3}$ | 90 |
| 1-12 | 12 | 24 | $0.1 \times 10^{-3}$ | liquified |
| 1-13 | 14 | 7 | $2.5 \times 10^{-3}$ | liquified |

As clearly shown in Table 1, it is appreciated that the larger the numbers of the ethylene oxide unit and the propylene oxide unit included In the prepolymer, the higher the ionic conductivity, but the volumetric contraction after storing at a high temperature becomes large, and that when the number of the ethylene oxide unit included in one branch exceeds 12 the electrolyte liquefies under the above-mentioned storing conditions. Further, if the unit number is smaller than 5, cracks are developed in the polymer electrolyte sheet after storing at a high temperature under the above-mentioned conditions.

Thus, it is concluded that among electrolytes comprising ethylene glycol, ammonium 2-butyloctanedioate and a prepolymer having a polyglyceride skeleton, the one having a composition wherein the number of the ethylene oxide units included in one branch of the prepolymer is in the range of from 5 to 12 best serves as an ion-conductive polymer electrolyte which satisfies both the requirements of high conductivity and high temperature-resistant property at the same time.

Besides, the prepolymer having an acryloyl group as the terminal group X employed in this example, a similar technical advantage is obtained with the one having a methacryloyl group.

Further, a similar advantage is obtained with the electrolyte prepared by adding to the mixture 20 mg of $\alpha,\alpha'$-azobisisobutyronitrile in place of the benzylmethyl ketal, as the cross-linking initiator, and by heating the added mixture under a nitrogen atmosphere at 70° C. for 2 hours, in place of the above-mentioned ultraviolet irradiation.

EXAMPLE 2

Different from the polymer electrolyte in Example 1 wherein the composition ratio by weight of the prepolymer, the salt and the solvent is fixed at 20:20:80, the composition ratio is varied in this example.

Each 20 g of ethylene glycol and 80 g of ammonium 2-butyloctanedioate, both of which are the same as those employed in Example 1 were used in this example as the salt and the solvent. These were added to the same prepolymer as sample No. 1–9 employed in Example 1, in varying amounts as listed after sample numbers in Table 2 below, to prepare each of the polymer electrolytes. The method of configuring the electrolyte sheet includes the use of 20 mg of benzyldimethyl ketal as the cross-linking initiator and the ultraviolet irradiation in the same manner as in Example 1.

Ionic conductivities at 20° C. and deformations in outer shapes of the electrolyte sheets prepared in the above-mentioned manner were measured and observed after storing them at 105° C. for 24 hours by the same methods as in Example 1, and the results of the measurements are summarized in Table 2.

TABLE 2

| Sample No. | Bulk monomer (g) | Salt (g) | Solvent (g) | Conductivity (S/cm) | Outer diameter maintenance rate (%) |
|---|---|---|---|---|---|
| 2-1 | 1000 | 20 | 80 | $1.0 \times 10^{-5}$ | 99 |
| 2-2 | 500 | 20 | 80 | $1.0 \times 10^{-4}$ | 98 |
| 2-3 | 100 | 20 | 80 | $1.5 \times 10^{-3}$ | 95 |
| 2-4 | 50 | 20 | 80 | $2.0 \times 10^{-3}$ | 93 |
| 1-9 | 20 | 20 | 80 | $3.0 \times 10^{-3}$ | 92 |
| 2-5 | 12 | 20 | 80 | $4.0 \times 10^{-3}$ | 90 |
| 2-6 | 10 | 20 | 80 | $5.0 \times 10^{-3}$ | 80 |
| 2-7 | 5 | 20 | 80 | Not cured | — |

As clearly shown in Table 2, it is appreciated that each of the polymer electrolytes having the prepolymer content of 90% or smaller as in sample Nos. 2-2, 2-3, 2-4 and 2-6 has a practically sufficient conductivity of $1.0 \times 10^{-4}$ S/cm or larger, and that each of the polymer electrolytes having the prepolymer content of 10% or larger as in sample Nos. 2-1, 2-2, 2-3, 2-4 and 2-5 has maintained an unprecedented physical stability under a severe storing condition of non-sealing at 105° C.

Based on the above discussion on the evaluation, it is concluded that an ion-conductive polymer electrolyte which satisfies both the high conductivity and the high temperature-resistant property at the same time has a composition of the prepolymer content in the electrolyte ranging from 10% to 90%.

EXAMPLE 3

In this example, availabilities of other materials than the ammonium 2-butyloctanedioate and ethylene glycol which are used as the salt and solvent for configuring the polymer electrolyte in Examples 1 and 2 are investigated.

As the prepolymer, 10 g of that which had been used as sample No. 1- 9 in Example 1 were used, and the polymer electrolytes were prepared with this prepolymer together with the salts and solvents listed in Tables 3 and 4 below. The method of preparing the electrolyte was the same as that in Example 1.

Tables 3 and 4 show ionic conductivities of the electrolytes prepared in the above-mentioned manner and measured at 20° C. Ionic conductivities of these electrolyte sheets measured after standing still in a non-sealed state under a nitrogen atmosphere at 105° C. for 24 hours are also shown in Tables 3 and 4.

In Tables 3 and 4, as well as in the subsequent description on the examples, the following abbreviations are used to indicate the corresponding compounds:

| | |
|---|---|
| Eg: Ethylene glycol | 2-Eg: Diethylene glycol |
| 3-Eg: Triethylene glycol | 4-Eg: Tetraethylene glycol |
| GBL: γ-Butyrolactone | PC: Propylene carbonate |
| EC: Ethylene carbonate | SL: Sulfolane |
| nDHA: n-n-Diformamide | DIMSO: Dimethyl sulfoxide |
| AN: Acetonitrile | |

TABLE 3

| Ammonium salt | Amount of addition (g) | Solvent | Amount of addtion (g) | Conductivity (mS/cm) Initial | After storing |
|---|---|---|---|---|---|
| Ammionium 2-butyl-octanedioate | 20 | Eg | 80 | 3.0 | 2.5 |
| | 15 | 2-Eg | 85 | 1.0 | 0.9 |
| | 10 | 3-Eg | 90 | 0.5 | 0.5 |
| | 5 | 4-Eg | 95 | 0.1 | 0.1 |
| Ammonium lactate | 10 | Eg | 90 | 2.0 | 1.5 |
| | 8 | 2-Eg | 92 | 1.5 | 1.2 |
| | 6 | 3-Eg | 94 | 0.5 | 0.5 |
| | 5 | 4-Eg | 95 | 0.1 | 0.1 |

TABLE 3-continued

| Ammonium salt | Amount of addition (g) | Solvent | Amount of addtion (g) | Conductivity (mS/cm) Initial | After storing |
|---|---|---|---|---|---|
| Ammonium benzoate | 15 | Eg | 85 | 2.0 | 1.5 |
|  | 10 | 2-Eg | 90 | 1.0 | 0.7 |
|  | 8 | 3-Eg | 92 | 0.5 | 0.5 |
|  | 5 | 4-Eg | 95 | 0.1 | 0.1 |
| Ammonium formate | 10 | Eg | 90 | 6.0 | 5.0 |
| Ammonium dihydrogen-citrate | 10 | Eg | 90 | 1.0 | 0.7 |
| Diammonium succinate | 10 | Eg | 90 | 2.5 | 2.0 |
| Ammonium salicylate | 10 | Eg | 90 | 3.0 | 2.5 |
| Diammonium tartarate | 10 | Eg | 90 | 0.2 | 0.2 |
| Diammonium sebacate | 10 | Eg | 90 | 0.5 | 0.4 |
| Ammonium p-nitro benzoate | 5 | Eg | 95 | 0.5 | 0.5 |

TABLE 4

| Ammonium salt | Amount of addition (g) | Solvent | Amount of addtion (g) | Conductivity (mS/cm) Initial | After storing |
|---|---|---|---|---|---|
| Tetraethyl ammonium hydrogenmaleate | 20 | GBL | 80 | 5.0 | 4.0 |
|  | 20 | PC | 80 | 6.5 | 5.5 |
|  | 20 | PC + EC | 80 | 3.0 | 2.8 |
| Tetraethyl ammonium hydrogenphthalate | 20 | GBL | 80 | 3.0 | 2.5 |
|  | 20 | PC | 80 | 5.0 | 4.5 |
|  | 20 | PC + EC | 80 | 3.0 | 2.8 |
| Tetramethyl ammonium hydrogenadipate | 10 | GBL | 90 | 4.5 | 4.0 |
| Tetraethyl ammonium hydrogenadipate | 15 | GBL | 85 | 4.0 | 3.7 |
| Tetrabutyl ammonium hydrogenadipate | 20 | GBL | 80 | 3.0 | 2.9 |
| Tetraethyl ammonium hydrogenoxalate | 10 | PC + SL | 90 | 1.0 | 0.8 |
| Tetraethyl ammonium hydrogenazelate | 10 | PC + nDHA | 90 | 3.0 | 2.8 |
| Tetraethyl ammonium borodisalicylate | 10 | PC + DIMSO | 90 | 5.0 | 4.8 |
| Tetraethyl ammonium γ-resorcilate | 10 | PC + AN | 90 | 5.0 | 4.8 |

From the results shown in the above tables, it is found that an ion-conductive polymer electrolyte, configured with any of the prepolymers shown by the formula (2), salts as well as solvents, has the high conductivity and is excellent in the high temperature-resistant property in practical point of view.

EXAMPLE 4

In this example, a description will be made on the concrete embodiments of the aluminum electrolytic capacitor configured with the ion-conductive polymer electrolyte shown in the precedent examples as its driving electrolyte.

Figure 1:
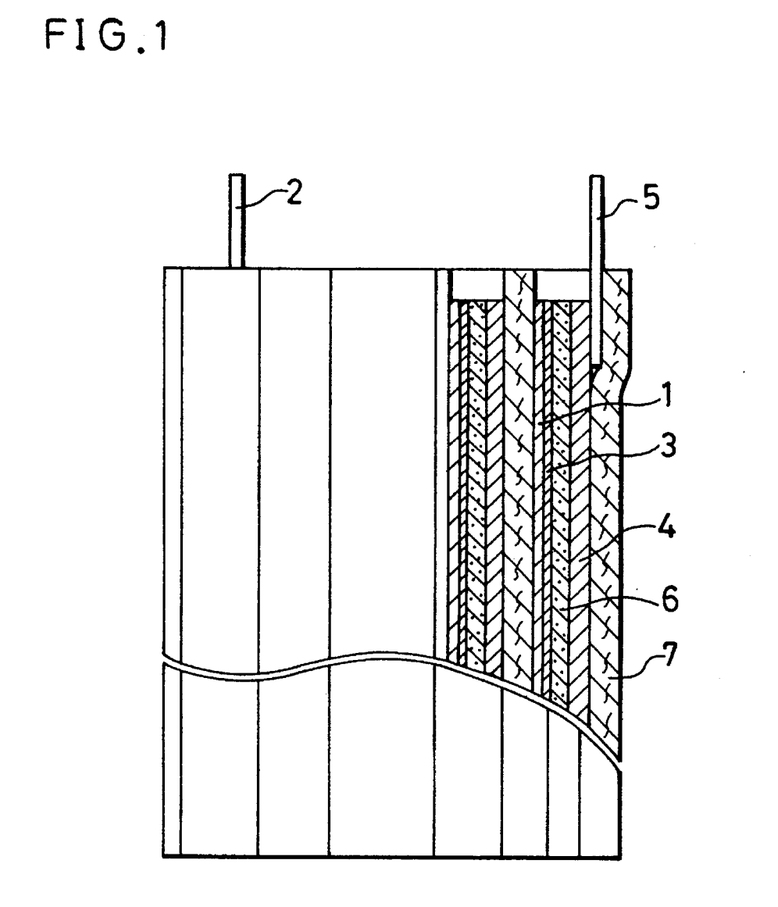
FIG.1 is a front view with a part in cross-section showing an aluminum electrolytic capacitor element built in accordance with an embodiment of the present invention.

FIG.1 is a plan view with a part in cross-section of the aluminum electrolytic capacitor configured with the electrolyte prepared in accordance with the present invention. On one side face of an electrode made of an aluminum foil of 3 cm×100 cm, having a thickness of 0.05mm, and a multiplicity of etched pores each having a diameter ranging from about 1 micron to about 5 microns, a positive electrode (anode) connector 2 was spot-welded. Next, the aluminum foil was anodized by soaking it in an aqueous solution of boric acid (concentration: 80 g/l) kept at 90° C. and by flowing a current of 30 A for 15 minutes to obtain a positive electrode on the surface of which a dielectric layer 3 was formed.

On the other hand, a negative electrode was prepared by spot-welding a negative electrode connector 5 on one side face of an electrode 4 made of an aluminum foil of 3 cm×100 cm having a thickness of 0.05 mm and a multiplicity of etched pores each having a diameter ranging from about 1 micron to about 5 microns.

Next, base liquids of the polymer electrolyte were prepared first by adding 100 g of the prepolymer identical with that of sample No. 1- 9 in Example 1 and 100 mg of benzyldimethyl ketal to a solution composed of 800 g of ethylene glycol and 200 g of ammonium 2-butyloctanedioate dissolved therein, and by stirring the whole to give a sufficiently homogeneous composition.

Figure 2:
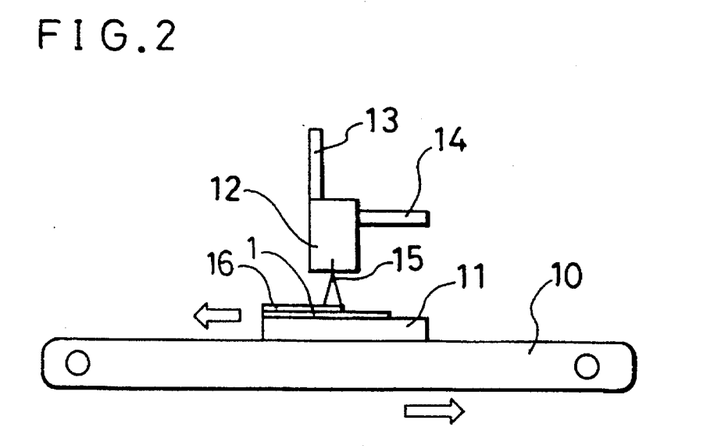
FIG.2 is a side view showing a schematic configuration of an apparatus for coating a base liquid for a polymer electrolyte on a dielectric substance layer.

Subsequently, the base liquid composition for the polymer electrolyte was coated on the dielectric layer 3 of the electrode 1 by using a coating apparatus 12 shown by FIG.2.

The coating apparatus 12 comprises a conveyer 10 for transferring a base plate 11 which in turn carries the positive electrode 1 coated with the electrolyte, a pipe 13 connected to a supply source of the electrolyte base liquid and a pipe 14 connected to a nitrogen gas bomb. The coating apparatus 12 atomizes the base liquid for the electrolyte at a rate of 1 liter/hour from a downwardly directed nozzle 15 having a diameter of 0.5 mm with a nitrogen pressure of 3 kg/cm$^2$.

By using the above-mentioned apparatus 12 whose nozzle 15 was fixed at a height 10 cm above the dielectric layer of the positive electrode 1, by transferring the base plate 11 carrying the positive electrode 1 at a speed of 10 cm/sec., and by atomizing the base liquid for the electrolyte from the nozzle 15 at a spouting angle of 22°, a coating layer 16 of the base liquid for the electrolyte was formed on the dielectric layer of the positive electrode.

Then, the above-mentioned coating layer 16 was irradiated with an ultraviolet ray of an intensity of 100 mJ by means of a high pressure mercury lamp to cure the coated base liquid for the polymer electrolyte. The polymer electrolyte layer 6 thus prepared has a thickness of 0.06 mm with a common difference of 20% or smaller.

Next, an electrode assembly composed of the positive electrode with the dielectric layer, the polymer electrolyte and the negative electrode were prepared by pressing the negative electrode 4 on the surface of the above-mentioned electrolyte layer and standing the whole still in air at 50° C. for 3 hours.

Finally, an aluminum electrolytic capacitor A of non-sealed type was produced by interlaying an insulator layer 7 made of Manila hemp on one side face of the above-mentioned electrode assembly and by rolling-up the whole in a spiral arrangement.

Separate from this, as a comparative example, another aluminum electrolytic capacitor B of non-sealed type was produced by using the known electrolyte prepared by dissolving 10 g of ammonium hydrogenadipate in 90 g of ethylene glycol in the following manner. That is, the same positive electrode foil and negative electrode foil as those used for preparing the aluminum electrolytic capacitor element A were rolled-up together with an insulator layer made of Manila hemp having a void ratio of 50% and a thickness of 0.1 mm in a spiral arrangement. Then the rolled-up body was impregnated with the known electrolyte at a pressure of 5 Torr at room temperature for one minute to obtain the capacitor element B.

An aging process was performed on the element A by applying a voltage of 400 V at 80° C. for two hours, and on the element B by applying a voltage of 400 V at room temperature for 24 hours.

Figure 3:
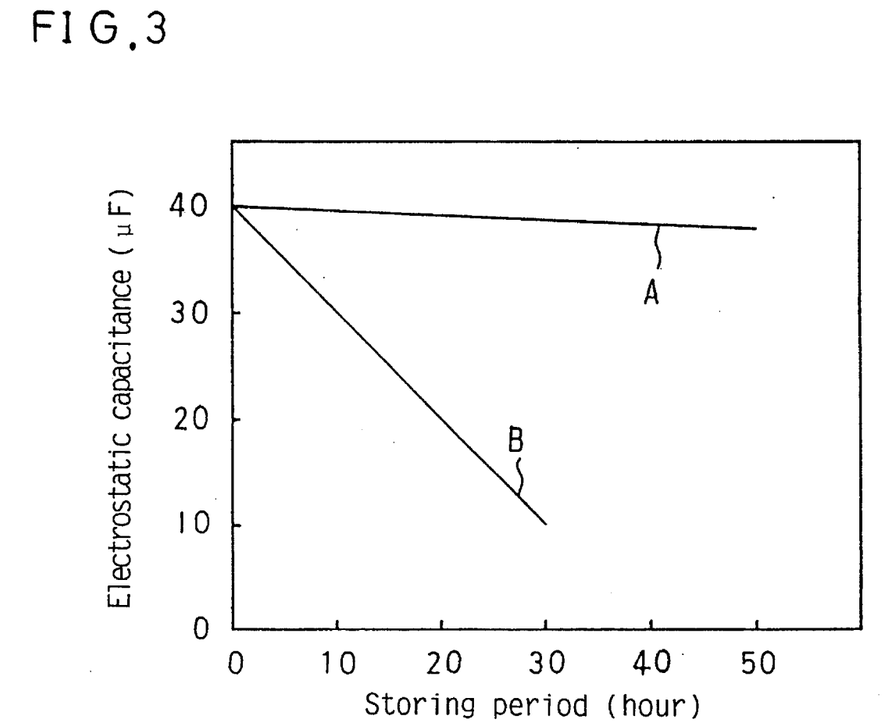
FIG.3 is a diagram showing changes in the electrostatic capacitances of the capacitor elements of the embodiment and of a comparative example during storing.
Figure 4:
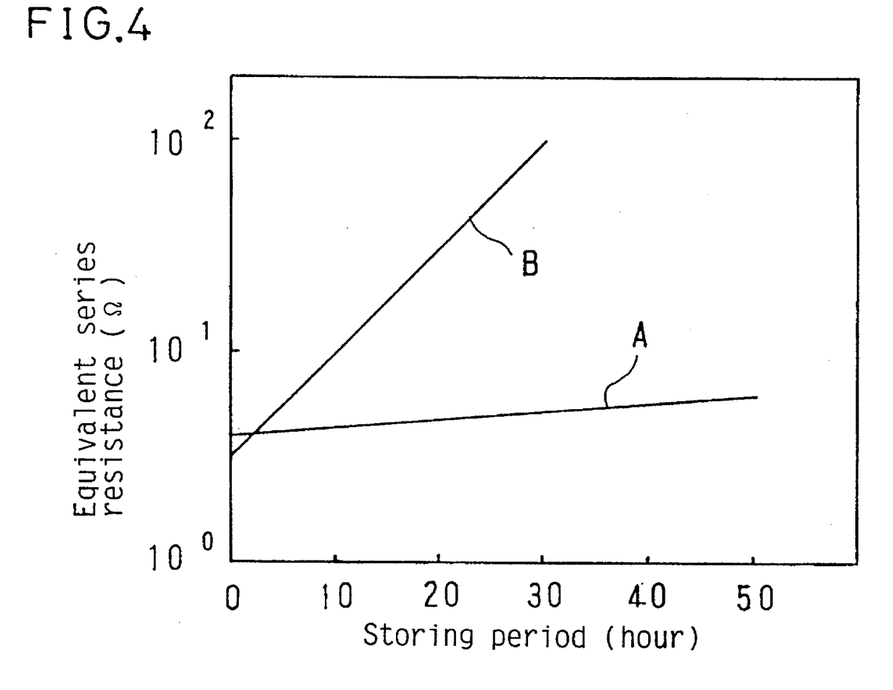
FIG.4 is a diagram showing changes in the equivalent series resistances of the capacitor elements of the embodiment and of a comparative example during storing.
Figure 5:
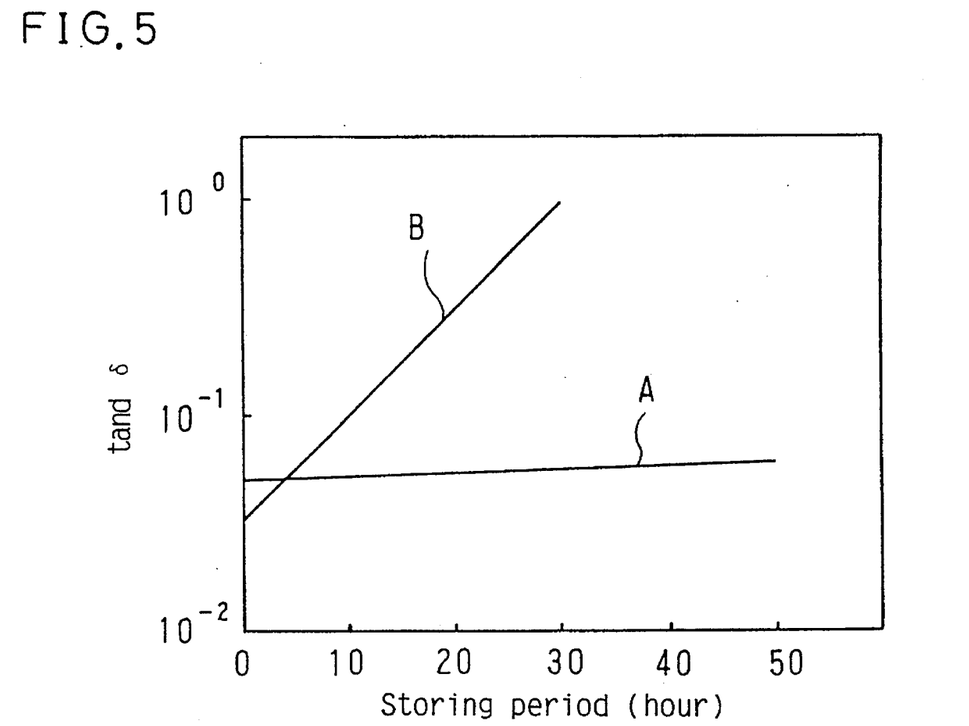
FIG.5 is a diagram showing changes in the tan δs of the capacitor elements of the embodiment and of a comparative example during storing.

For the purpose of further evaluating the stabilities of the electrolytes in the aluminum electrolytic capacitor element A of this example and the capacitor element B of the comparative example during storing in an environment at a high temperature, measurements were made as accelerated tests on electrostatic capacitance, equivalent series resistance and tan δ (loss angle), as well as their changes by aging after the storing at 105° C. in a non-sealed state. The results thereof are shown by FIG.3, FIG.4 and FIG.5, respectively. The above measurements were performed at 20° C. and 120 Hz.

As clearly shown by these figures, it is appreciated that the characteristics of capacitor element B of the comparative example, which is configured with the known electrolyte employing ethylene glycol as its solvent, deteriorate at an early stage of the tests; but the capacitor element A configured with the electrolyte of the present invention has a sufficient reliability in its stability.

EXAMPLE 5

In this example, a description will be made on the ionic conductivity and the reliability for the high temperature storing of the electrolyte which is prepared by using a prepolymer of the compound represented by the formula (3), wherein the terminal group X is an acryloyl group.

First, a solution was prepared by dissolving 20 g of ammonium 2-butyloctanedioate in 80 g of ethylene glycol. Next, to this solution, added were 20 g of the prepolymer represented by the formula (3), wherein the number 1×n for the ethylene oxide (E0) unit and that m×n for the propylene oxide (PO) unit included in one branch are adjusted as listed after sample numbers in Table 5 below, as well as 20 mg of benzyldimethyl ketal as a cross-linking initiator, and the obtained mixture was stirred well to dissolve the additives. Each of the mixtures was spread over a stainless steel tray in a thickness of 0.5 mm and irradiated by a high pressure mercury lamp of 100 mJ under a nitrogen atmosphere to obtain an ion-conductive polymer electrolyte sheet.

Ionic conductivities at 20° C. of the electrolyte sheets prepared in the above-mentioned manner and their deformations after the storing at 105° C. for 24 hours were measured and observed by a method similar to that in Example 1, and the results of the measurements are summarized in Table 5.

TABLE 5

| Sample No. | Unit number EO | Unit number PO | Conductivity (S/cm) | Outer diameter maintenance rate (%) |
|---|---|---|---|---|
| 5-1 | 2 | 1 | Not cured | — |
| 5-2 | 4 | 2 | 1.1 × 10$^{-3}$ | cracks developed |
| 5-3 | 6 | 3 | 1.4 × 10$^{-3}$ | 99 |
| 5-4 | 8 | 3 | 2.0 × 10$^{-3}$ | 98 |
| 5-5 | 8 | 4 | 1.7 × 10$^{-3}$ | 95 |
| 5-6 | 8 | 8 | 0.9 × 10$^{-3}$ | 93 |
| 5-7 | 8 | 16 | 0.1 × 10$^{-3}$ | 90 |
| 5-8 | 10 | 5 | 2.2 × 10$^{-3}$ | 93 |
| 5-9 | 12 | 4 | 3.3 × 10$^{-3}$ | 92 |
| 5-10 | 12 | 6 | 2.2 × 10$^{-3}$ | 91 |
| 5-11 | 12 | 12 | 1.1 × 10$^{-3}$ | 90 |
| 5-12 | 12 | 24 | 0.1 × 10$^{-3}$ | liquified |
| 5-13 | 14 | 7 | 2.8 × 10$^{-3}$ | liquified |

As clearly shown in Table 5, it is appreciated that the larger the numbers of the ethylene oxide unit and the propylene oxide unit included in the prepolymer, the higher the ionic conductivity, but the volumetric contraction after storing at a high temperature also becomes large. It is also appreciated that when the number of the ethylene oxide unit included in one branch exceeds 12, the electrolyte liquefies under the above-mentioned conditions. Further, if the unit number is smaller than 5, cracks are developed in the polymer electrolyte sheet after storing at a high temperature of the above-mentioned conditions.

Thus, it is concluded that among electrolytes comprising ethylene glycol, ammonium 2-butyloctanedioate and a prepolymer having a trimethylol propane skeleton, the one having a composition wherein the number of the ethylene oxide units included in one branch of the prepolymer is in the range of from 5 to 12 best serves as an ion-conductive polymer electrolyte which satisfies both the requirements of high conductivity and high temperature-resistant property at the same time.

Further, a similar advantage is obtained with the prepolymer of a trimethylol ethane skeleton represented by the formula (4).

EXAMPLE 6

Different from the polymer electrolyte in Example 5 wherein the composition ratio by weight of the prepolymer, the salt and the solvent is fixed at 20:20:80, the composition ratio is varied in this Example 6.

Each 20 g of ethylene glycol and 80 g of ammonium 2-butyloctanedioate, both of which are the same as employed in Example 5, were used in this example as the salt and the solvent, and were added to the same prepolymer as sample No. 5-9 employed in Example 5 in various amounts as listed in Table 6 below, to prepare the polymer electrolyte. The method of configuring the electrolyte sheet includes the use of 20 mg of benzyldimethyl ketal as the cross-linking initiator and the ultraviolet irradiation in the same manner as in Example 5.

Ionic conductivities at 20° C. of the electrolytes prepared in the above-mentioned manner and deformations in shapes of the electrolytes after storing at 105° C. for 24 hours were measured and observed by the same method as in Example 1 and the results of the measurements are summarized in Table 6.

TABLE 6

| Sample No. | Bulk monomer (g) | Salt (g) | Solvent (g) | Conductivity (S/cm) | Outer diameter maintenance rate (%) |
|---|---|---|---|---|---|
| 6-1 | 1000 | 20 | 80 | $1.1 \times 10^{-5}$ | 99 |
| 6-2 | 500 | 20 | 80 | $1.1 \times 10^{-4}$ | 98 |
| 6-3 | 100 | 20 | 80 | $1.7 \times 10^{-3}$ | 95 |
| 6-4 | 50 | 20 | 80 | $2.2 \times 10^{-3}$ | 93 |
| 5-9 | 20 | 20 | 80 | $3.3 \times 10^{-3}$ | 92 |
| 6-5 | 12 | 20 | 80 | $4.4 \times 10^{-3}$ | 90 |
| 6-6 | 10 | 20 | 80 | $5.5 \times 10^{-3}$ | 80 |
| 6-7 | 5 | 20 | 80 | Not cured | — |

As clearly shown in Table 6, it is appreciated that each of the polymer electrolytes having the prepolymer content of 90% or smaller as in sample Nos. 6-2, 6-3, 6-4 and 6-6 has a practically sufficient conductivity of $1.0 \times 10^{-4}$ S/cm or larger, and that each of the polymer electrolytes having the prepolymer content of 10% or larger as in sample Nos. 6-1, 6-2, 6-3, 6-4 and 6-5 has an unprecedented physical stability under severe storing condition of non-sealing at 105° C.

Based on the above-mentioned discussion on the evaluation, it is concluded that an ion-conductive polymer electrolyte which satisfies both the high conductivity and the high temperature-resistant property at the same time has a composition of the prepolymer content in the electrolyte ranging from 10% to 90%.

Besides the prepolymer whose terminal group X is an acryloyl group used in this example, the one having a methacryloyl group is used with a similar advantage.

Further, a similar advantage is obtained with a prepolymer of trimethylol ethane of the formula (4).

EXAMPLE 7

In this example, an investigation is made on the availability of the materials other than ammonium 2-butyloctanedioate and ethylene glycol which are used as the salt and solvent for configuring the polymer electrolyte in Examples 5 and 6.

As the prepolymer, 10 g of what had been used as sample No. 5-9 in Example 5 was used, and the polymer electrolytes were prepared with this prepolymer together with the salts and solvents in various amounts as listed in Tables 7 and 8. The method of preparing the electrolyte was the same as that in Example 5.

Tables 7 and 8 show ion conductivities of the electrolytes prepared in the above-mentioned manner and measured at 20° C. Ionic conductivities of these electrolyte sheets measured after standing them still under a nitrogen atmosphere in a non-sealed state at 105° C. for 24 hours are also shown in Tables 7 and 8.

TABLE 7

| Ammonium salt | Amount of addition (g) | Solvent | Amount of addtion (g) | Conductivity (mS/cm) | |
|---|---|---|---|---|---|
| | | | | Initial | After storing |
| Ammonium 2-butyl-octanedioate | 20 | Eg | 80 | 3.3 | 2.9 |
| | 15 | 2-Eg | 85 | 1.1 | 1.0 |
| | 10 | 3-Eg | 90 | 0.6 | 0.6 |
| | 5 | 4-Eg | 95 | 0.1 | 0.1 |
| Ammonium lactate | 10 | Eg | 90 | 2.2 | 1.8 |
| | 8 | 2-Eg | 92 | 1.8 | 1.6 |
| | 6 | 3-Eg | 94 | 0.6 | 0.6 |
| | 5 | 4-Eg | 95 | 0.1 | 0.1 |
| Ammonium benzoate | 15 | Eg | 85 | 2.2 | 1.9 |
| | 10 | 2-Eg | 90 | 1.1 | 0.9 |
| | 8 | 3-Eg | 92 | 0.6 | 0.6 |
| | 5 | 4-Eg | 95 | 0.1 | 0.1 |
| Ammonium formate | 10 | Eg | 90 | 6.6 | 6.0 |
| Ammonium dihydrogen-citrate | 10 | Eg | 90 | 1.1 | 0.9 |
| Diammonium succinate | 10 | Eg | 90 | 2.8 | 2.6 |
| Ammonium salicylate | 10 | Eg | 90 | 3.3 | 2.9 |
| Diammonium tartarate | 10 | Eg | 90 | 0.2 | 0.2 |
| Diammonium sebacate | 10 | Eg | 90 | 0.6 | 0.5 |
| Ammonium p-nitro benzoate | 5 | Eg | 95 | 0.6 | 0.5 |

TABLE 8

| Ammonium salt | Amount of addition (g) | Solvent | Amount of addtion (g) | Conductivity (mS/cm) Initial | After storing |
|---|---|---|---|---|---|
| Tetraethyl ammonium hydrogenmaleate | 20 | GBL | 80 | 5.5 | 4.9 |
| | 20 | PC | 80 | 7.3 | 6.5 |
| | 20 | PC + EC | 80 | 3.3 | 3.1 |
| Tetraethyl ammonium hydrogenphthalate | 20 | GBL | 80 | 3.3 | 3.1 |
| | 20 | PC | 80 | 5.5 | 5.1 |
| | 20 | PC + EC | 80 | 3.3 | 3.0 |
| Tetramethyl ammonium hydrogenadipate | 10 | GBL | 90 | 5.1 | 4.9 |
| Tetraethyl ammonium hydrogenadipate | 15 | GBL | 85 | 4.4 | 4.0 |
| Tetrabutyl ammonium hydrogenadipate | 20 | GBL | 80 | 3.3 | 3.1 |
| Tetraethyl ammonium hydrogenoxalate | 10 | PC + SL | 90 | 1.1 | 0.9 |
| Tetraethyl ammonium hydrogenazelate | 10 | PC + nDHA | 90 | 3.3 | 3.0 |
| Tetraethyl ammonium borodisalicylate | 10 | PC + DIMSO | 90 | 5.5 | 5.2 |
| Tetraethyl ammonium γ-resorcilate | 10 | PC + AN | 90 | 5.5 | 5.3 |

From the results shown in the above tables, it is found that an ion-conductive polymer electrolyte configured with any of the prepolymers shown by the formula (3) or (4), the salts as well as solvents listed in the tables has the practically sufficient conductivity and is excellent in the high temperature-resistant property.

EXAMPLE 8

In this example, a description will be made on the concrete embodiments of the aluminum electrolytic capacitor configured with the ion-conductive polymer electrolyte shown in Examples 5-7 as its driving electrolyte.

In the same manner as that in Example 4 except the use of the prepolymer of sample No. 5-9 of Example 5 for the polymer electrolyte, an aluminum electrolytic capacitor C was prepared.

Figure 6:
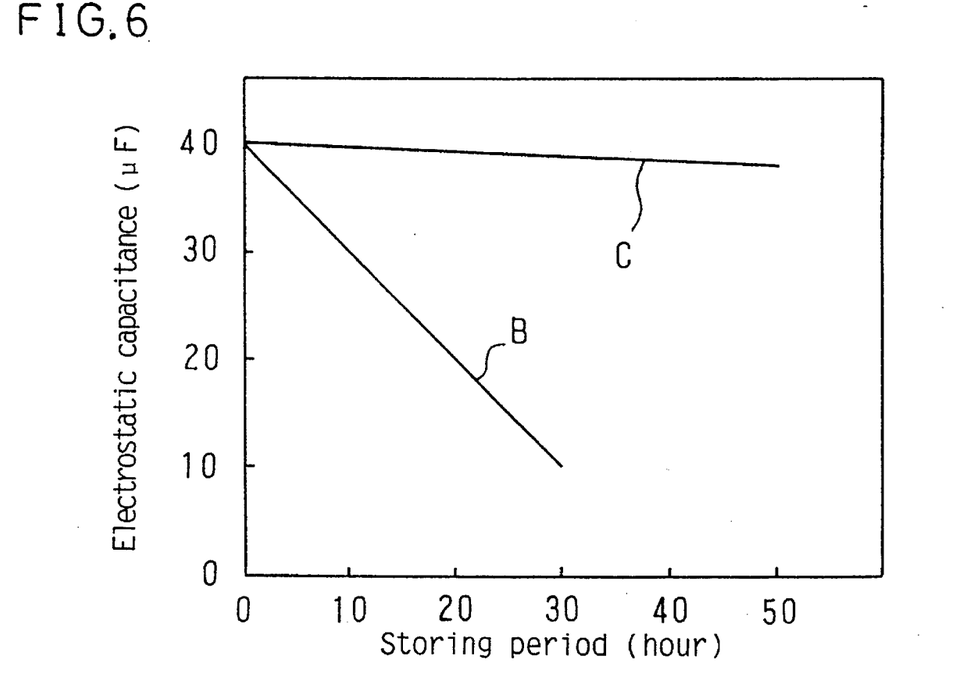
FIG.6 is a diagram showing changes in the electrostatic capacitances of the capacitor elements of another embodiment and of a comparative example during storing.
Figure 7:
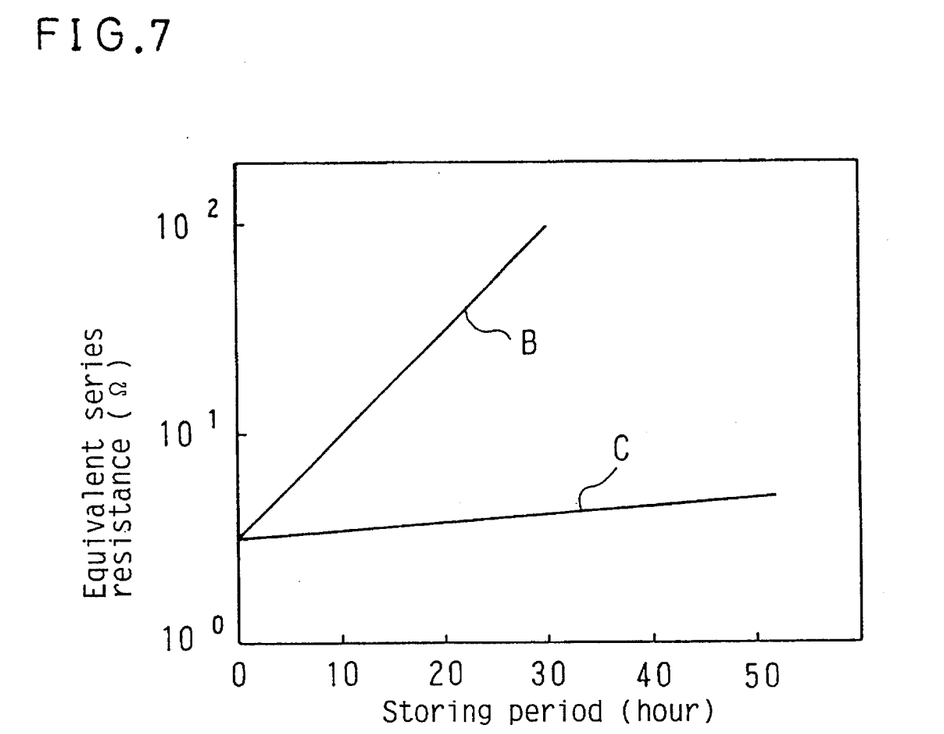
FIG.7 is a diagram showing changes in the equivalent series resistances of the capacitor elements of the embodiment and of a comparative example during storing.
Figure 8:
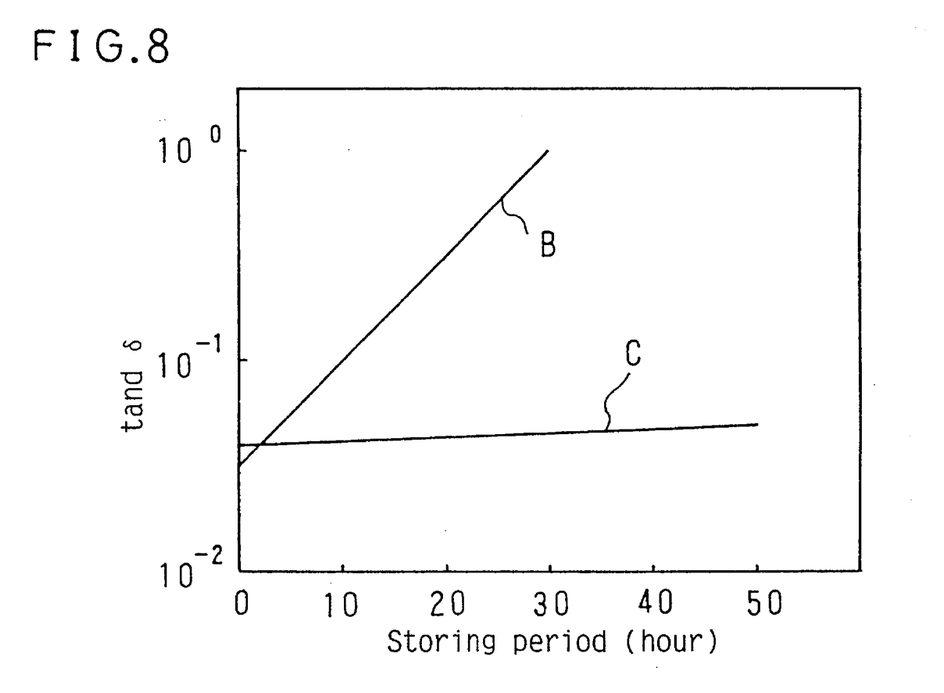
FIG.8 is a diagram showing changes in the tan δs of the capacitor elements of the embodiment and of a comparative example during storing.

The results of measurements on electrostatic capacitance, equivalent series resistance and tan δ (loss angle), as well as their changes by aging performed on the capacitor C as well as the capacitor B of the comparative example under the same conditions as those in Example 4 are shown in FIG. 6, FIG. 7 and FIG. 8, respectively.

As clearly shown by these figures, it is appreciated that the characteristics of capacitor element C configured with the electrolyte of the present invention have a sufficient reliability.

EXAMPLE 9

In this example, a description will be made on the ion conductivity and the reliability for the high temperature storing of the electrolyte which is prepared by using prepolymers of the compounds represented by the formula (3), wherein the terminal group X is a methacryloyl group, but different from those in Example 5.

First, a solution was prepared by dissolving 20 g of ammonium 2-butyloctanedioate in 80 g of ethylene glycol. Next, to this solution, added were 20 g of the prepolymer represented by the formula (3), wherein the number 1×n for the ethylene oxide (EO) unit and that m×n for the propylene oxide unit included in one branch are adjusted as listed in Table 9 below, as well as 40 mg of benzyldimethyl ketal as a cross-linking initiator, and the obtained mixture was stirred well to dissolve the additives. Each of the mixtures was spread over a stainless steel tray in a thickness of 0.5 mm and irradiated by a high pressure mercury lamp of 100 mJ under a nitrogen atmosphere to obtain an ion-conductive polymer electrolyte sheet.

Ionic conductivities at 20° C. of the electrolytes prepared in the above-mentioned manner and their deformations after the storing at 105° C. for 24 hours were measured and observed by a method similar to that in Example 1, and the results of the measurements are summarized in Table 9.

TABLE 9

| Sample No. | Unit number EO | Unit number PO | Conductivity (S/cm) | Outer diameter maintenance rate (%) |
|---|---|---|---|---|
| 9-1 | 1 | 1 | Not cured | — |
| 9-2 | 3 | 0 | Not cured | — |
| 9-3 | 3 | 3 | $0.5 \times 10^{-3}$ | cracks developed |
| 9-4 | 5 | 0 | $0.5 \times 10^{-3}$ | 98 |
| 9-5 | 5 | 2 | $0.7 \times 10^{-3}$ | 95 |
| 9-6 | 5 | 5 | $1.5 \times 10^{-3}$ | liquified |
| 9-7 | 10 | 0 | $2.0 \times 10^{-3}$ | 90 |
| 9-8 | 10 | 5 | $2.5 \times 10^{-3}$ | 93 |
| 9-9 | 10 | 10 | $3.3 \times 10^{-3}$ | liquified |
| 9-10 | 13 | 0 | $2.2 \times 10^{-3}$ | 85 |
| 9-11 | 13 | 5 | $2.5 \times 10^{-3}$ | 80 |
| 9-12 | 13 | 10 | $2.8 \times 10^{-3}$ | liquified |
| 9-13 | 15 | 0 | $2.5 \times 10^{-3}$ | liquified |

As clearly shown in Table 9, it is appreciated that the larger the numbers of the ethylene oxide unit and the propylene oxide unit included in the prepolymer, the higher the ionic conductivity, but the volumetric contraction after storing at a high temperature becomes large, and that when the number of the ethylene oxide unit included in one branch exceeds 15 the electrolyte liquefies under the above-mentioned conditions. Further, if the number of the ethylene oxide unit is smaller than 5, cracks are developed in the polymer electrolyte sheet after storing at a high temperature under the above-mentioned conditions.

Thus, it is concluded that among electrolytes comprising ethylene glycol, ammonium 2-butyloctanedioate and a prepolymer having a trimethylol propane wherein the terminal group X is a methacrylol group, the one having a composition wherein the number of the ethylene oxide units included in one branch of the prepolymer is in the range of from 5 to 15 best serves as an ion-conductive polymer electrolyte which satisfies both the requirements of high conductivity and high temperature-resistant property at the same time.

Further, a similar advantage is obtained with the prepolymer of a trimethylol ethane skeleton represented by the formula (4).

EXAMPLE 10

In this example, a description will be made on the ionic conductivity and the reliability under the high temperature storing of the electrolyte which is prepared by using a prepolymer of the compound represented by the formula (5), wherein the terminal group X is a methacryloyl group.

First, a solution was prepared by dissolving 20 g of ammonium 2-butyloctanedioate in 80 g of ethylene glycol. Next, to this solution, added were 20 g of the prepolymer represented by the formula (5), wherein the number 1×n for the ethylene oxide (EO) unit and that m×n for the propylene oxide (PO) unit included in one branch are adjusted as listed in Table 10 below, as well as 20 mg of benzyldimethyl ketal as a cross-linking initiator, and the obtained mixture was stirred well to dissolve the additives. Each of the mixtures was spread over a stainless steel tray in a thickness of 0.5 mm and irradiated by a high pressure mercury lamp with an intensity of 100 mJ under a nitrogen atmosphere to obtain an ion-conductive polymer electrolyte sheet.

Ionic conductivities at 20° C. of the electrolytes prepared in the above-mentioned manner and their deformations after the storing at 105° C. for 24 hours were measured and observed by a method similar to that in Example 1, and the results of the measurements are summarized in Table 10.

TABLE 10

| Sample No. | Unit number | | Conductivity (S/cm) | Outer diameter maintenance rate (%) |
|---|---|---|---|---|
| | EO | PO | | |
| 10-1 | 2 | 1 | Not cured | — |
| 10-2 | 4 | 2 | $1.3 \times 10^{-3}$ | cracks developed |
| 10-3 | 7 | 3 | $1.6 \times 10^{-3}$ | 99 |
| 10-4 | 10 | 3 | $2.2 \times 10^{-3}$ | 98 |
| 10-5 | 10 | 5 | $1.9 \times 10^{-3}$ | 95 |
| 10-6 | 10 | 7 | $1.1 \times 10^{-3}$ | 93 |
| 10-7 | 10 | 20 | $0.1 \times 10^{-3}$ | 90 |
| 10-8 | 13 | 7 | $2.4 \times 10^{-3}$ | 93 |
| 10-9 | 16 | 6 | $3.6 \times 10^{-3}$ | 92 |
| 10-10 | 16 | 8 | $2.5 \times 10^{-3}$ | 91 |
| 10-11 | 16 | 16 | $1.3 \times 10^{-3}$ | 90 |
| 10-12 | 16 | 32 | $0.1 \times 10^{-3}$ | liquified |
| 10-13 | 18 | 9 | $2.8 \times 10^{-3}$ | liquified |

As clearly shown in Table 10, it is appreciated that the larger the numbers of the ethylene oxide unit and the propylene oxide unit included in the prepolymer, the higher the ionic conductivity, but the volumetric contraction after storing at a high temperature becomes large; and that when the number of the ethylene oxide unit included in one branch exceeds 16 the electrolyte liquefies under the above-mentioned conditions. Further, if the number of the ethylene oxide unit is smaller than 5, cracks are developed in the polymer electrolyte sheet after storing it at a high temperature under the above-mentioned conditions.

Thus, it is concluded that among electrolytes comprising ethylene glycol, ammonium 2-butyloctanedioate and a prepolymer having a tetramethylol methane skeleton, the one having a composition wherein the number of the ethylene oxide units included in one branch of the prepolymer is in the range of from 5 to 16 best serves as an ion-conductive polymer electrolyte which satisfies both the requirements of high conductivity and high temperature-resistant property at the same time.

Besides the prepolymer with the terminal group X of an acryloyl group used in this example, a similar advantage is obtained with the prepolymer with the terminal group X of a methacryloyl group.

EXAMPLE 11

Different from the polymer electrolyte in Example 10 wherein the composition ratio by weight of the prepolymer, the salt and the solvent is fixed at 20:20:80, the composition ratio is varied in this example.

Each 20 g of ethylene glycol and 80 g of ammonium 2-butyloctanedioate, both of which are the same as those employed in Example 10, were used in this example as the salt and the solvent, and were added to the same prepolymer as sample No. 10-9 employed in Example 10 in various amounts as listed in Table 11 below, to prepare the polymer electrolyte. The method of configuring the electrolyte sheet includes the use of 20 mg of benzyldimethyl ketal as the cross-linking initiator and the ultraviolet irradiation in the same manner as in Example 10.

Ionic conductivities at 20° C. of the electrolytes prepared in the above-mentioned manner and their deformations in shapes after storing at 105° C. for 24 hours were measured and observed by the same method as in Example 1 and the results of the measurement are summarized in Table 11.

TABLE 11

| Sample No. | Bulk monomer (g) | Salt (g) | Solvent (g) | Conductivity (S/cm) | Outer diameter maintenance rate (%) |
|---|---|---|---|---|---|
| 11-1 | 1000 | 20 | 80 | $1.3 \times 10^{-5}$ | 99 |
| 11-2 | 500 | 20 | 80 | $1.3 \times 10^{-4}$ | 98 |
| 11-3 | 100 | 20 | 80 | $1.9 \times 10^{-3}$ | 95 |
| 11-4 | 50 | 20 | 80 | $2.4 \times 10^{-3}$ | 93 |
| 11-9 | 20 | 20 | 80 | $3.6 \times 10^{-3}$ | 92 |
| 11-5 | 12 | 20 | 80 | $4.8 \times 10^{-3}$ | 90 |
| 11-6 | 10 | 20 | 80 | $5.9 \times 10^{-3}$ | 80 |
| 11-7 | 5 | 20 | 80 | Not cured | — |

As clearly shown in Table 11, it is appreciated that each of the polymer electrolytes having the prepolymer content of 90% or smaller as in sample Nos. 11-2, 11-3, 11-4 and 11-6 has a practically sufficient conductivity of $1.0 \times 10^{-4}$ S/cm or larger, and that each of the polymer electrolytes having the prepolymer content of 10% or larger as in sample Nos. 11-1, 11-2, 11-3, 11-4 and 11-5 has an unprecedented physical stability under severe storing condition of non-sealing at 105° C.

Based on the above discussion on the evaluation, it is concluded that an ion-conductive polymer electrolyte which satisfies both the high conductivity and the high temperature-resistant property at the same time has a composition of the prepolymer content in the electrolyte ranging from 10% to 90%.

Although the prepolymer whose terminal group X is acryloyl group is used in this example, a similar advantage is obtained with the one having a methacryloyl group.

EXAMPLE 12

In this example, an investigation is made on the availability of the materials other than ammonium 2-butyloctanedioate and ethylene glycol which are used as the salt and solvent for configuring the polymer electrolyte in Examples 10 and 11.

As the prepolymer, 10 g of that which had been used as sample No. 10-9 in Example 10 was used, and the polymer electrolytes were prepared with this prepolymer together with the salts and solvents as listed in Tables 12 and 13 below. The method of preparing the electrolyte was the same as that in Example 10.

Tables 12 and 13 show ion conductivities of the electrolytes prepared in the above-mentioned manner and measured at 20° C. Ionic conductivities of these electrolyte sheets measured after standing them still under a nitrogen atmosphere in a non-sealed state at 105° C. for 24 hours are also shown in Tables 12 and 13.

TABLE 12

| | | | | Conductivity (mS/cm) | |
|---|---|---|---|---|---|
| Ammonium salt | Amount of addition (g) | Solvent | Amount of addtion (g) | Initial | After storing |
| Ammonium 2-butyl- | 20 | Eg | 150 | 3.6 | 3.1 |
| octanedioate | 15 | 2-Eg | 150 | 1.2 | 1.0 |
| | 10 | 3-Eg | 150 | 0.7 | 0.6 |
| | 5 | 4-Eg | 150 | 0.1 | 0.1 |
| Ammonium lactate | 10 | Eg | 150 | 2.5 | 1.8 |
| | 8 | 2-Eg | 150 | 2.0 | 1.8 |
| | 6 | 3-Eg | 150 | 0.7 | 0.7 |
| | 5 | 4-Eg | 150 | 0.1 | 0.1 |
| Ammonium benzoate | 15 | Eg | 100 | 2.5 | 2.3 |
| | 10 | 2-Eg | 100 | 1.2 | 1.1 |
| | 8 | 3-Eg | 100 | 0.7 | 0.7 |
| | 5 | 4-Eg | 100 | 0.1 | 0.1 |
| Ammonium formate | 10 | Eg | 150 | 6.5 | 6.3 |
| Ammonium dihydrogen-citrate | 10 | Eg | 150 | 1.2 | 1.1 |
| Diammonium succinate | 10 | Eg | 150 | 2.9 | 2.8 |
| Ammonium salicylate | 10 | Eg | 150 | 3.6 | 3.3 |
| Diammonium tartarate | 10 | Eg | 150 | 0.2 | 0.2 |
| Diammonium sebacate | 10 | Eg | 150 | 0.7 | 0.6 |
| Ammonium p-nitro benzoate | 5 | Eg | 150 | 0.7 | 0.6 |

TABLE 13

| | | | | Conductivity (mS/cm) | |
|---|---|---|---|---|---|
| Ammonium salt | Amount of addition (g) | Solvent | Amount of addtion (g) | Initial | After storing |
| Tetraethyl ammonium | 20 | GBL | 100 | 5.5 | 5.3 |
| hydrogenmaleate | 20 | PC | 100 | 6.3 | 6.2 |
| | 20 | PC + EC | 100 | 3.3 | 3.1 |
| Tetraethyl ammonium | 20 | GBL | 100 | 3.3 | 3.1 |
| hydrogenphthalate | 20 | PC | 100 | 5.5 | 5.1 |
| | 20 | PC + EC | 100 | 3.3 | 3.0 |
| Tetramethyl ammonium hydrogenadipate | 10 | GBL | 100 | 5.1 | 4.9 |
| Tetraethyl ammonium hydrogenadipate | 15 | GBL | 100 | 4.4 | 4.1 |
| Tetrabutyl ammonium hydrogenadipate | 20 | GBL | 100 | 3.3 | 3.1 |
| Tetraethyl ammonium hydrogenoxalate | 10 | PC + SL | 100 | 1.1 | 0.9 |
| Tetraethyl ammonium hydrogenazelate | 10 | PC + nDHA | 100 | 3.3 | 3.0 |
| Tetraethyl ammonium borodisalicylate | 10 | PC + DIMSO | 100 | 5.5 | 5.2 |
| Tetraethyl ammonium γ-resorcilate | 10 | PC + AN | 100 | 5.5 | 5.3 |

From the results shown in the above tables, it is found that an ion-conductive polymer electrolyte, configured with any of the prepolymers shown by the formula (5), salts as well as solvents as listed in Tables 12 and 13, has the practically sufficient conductivity and is excellent in the high temperature-resistant property.

EXAMPLE 13

In this example, a description will be made on the concrete embodiments of the aluminum electrolytic capacitor configured with the ion conductive polymer electrolyte shown in Examples 10-12 as its driving electrolyte.

In a similar manner to that in Example 4 except the use of the prepolymer of sample No. 10-9 in Example 10 for the polymer electrolyte, an aluminum electrolytic capacitor D was prepared.

Figure 9:
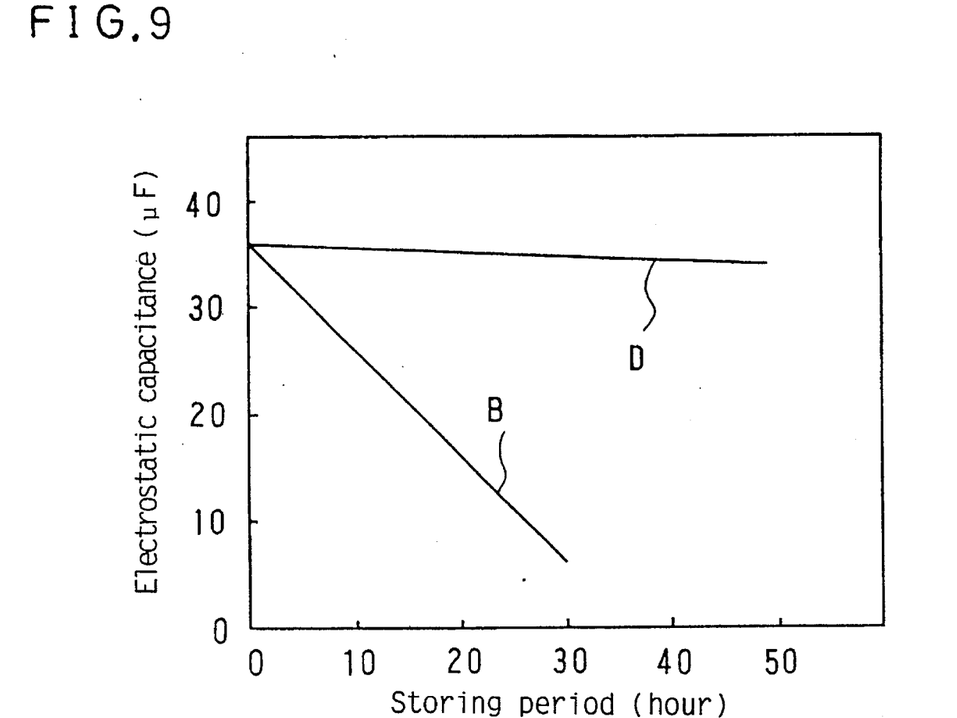
FIG.9 is a diagram showing changes in the electrostatic capacitances of the capacitor elements of a further embodiment and of a comparative example during storing.
Figure 10:
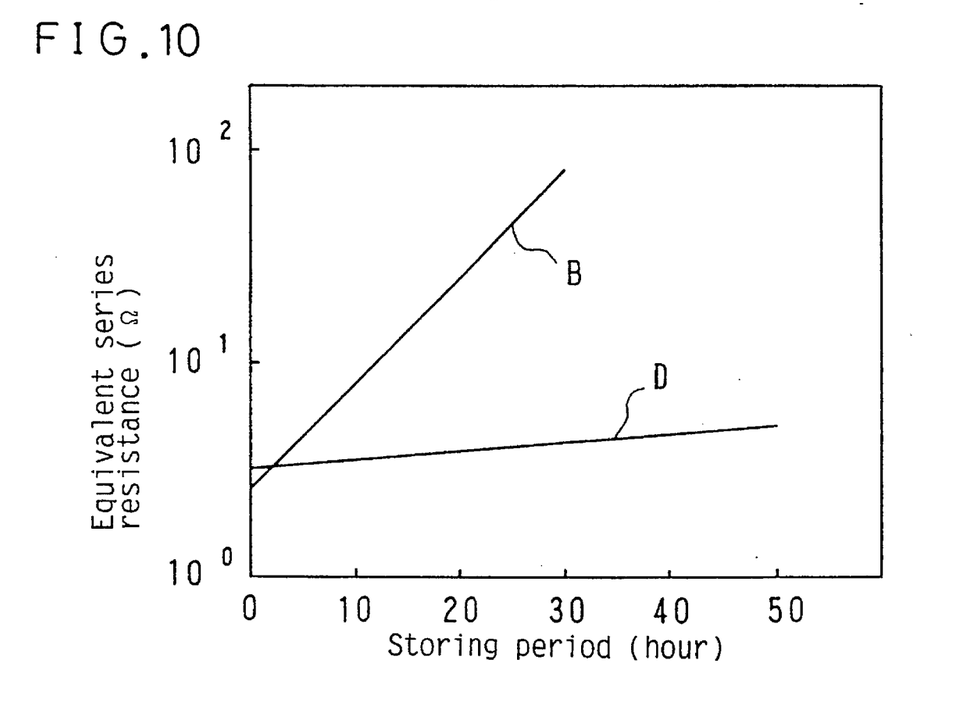
FIG.10 is a diagram showing changes in the equivalent series resistances of the capacitor elements of the embodiment and of a comparative example during storing.
Figure 11:
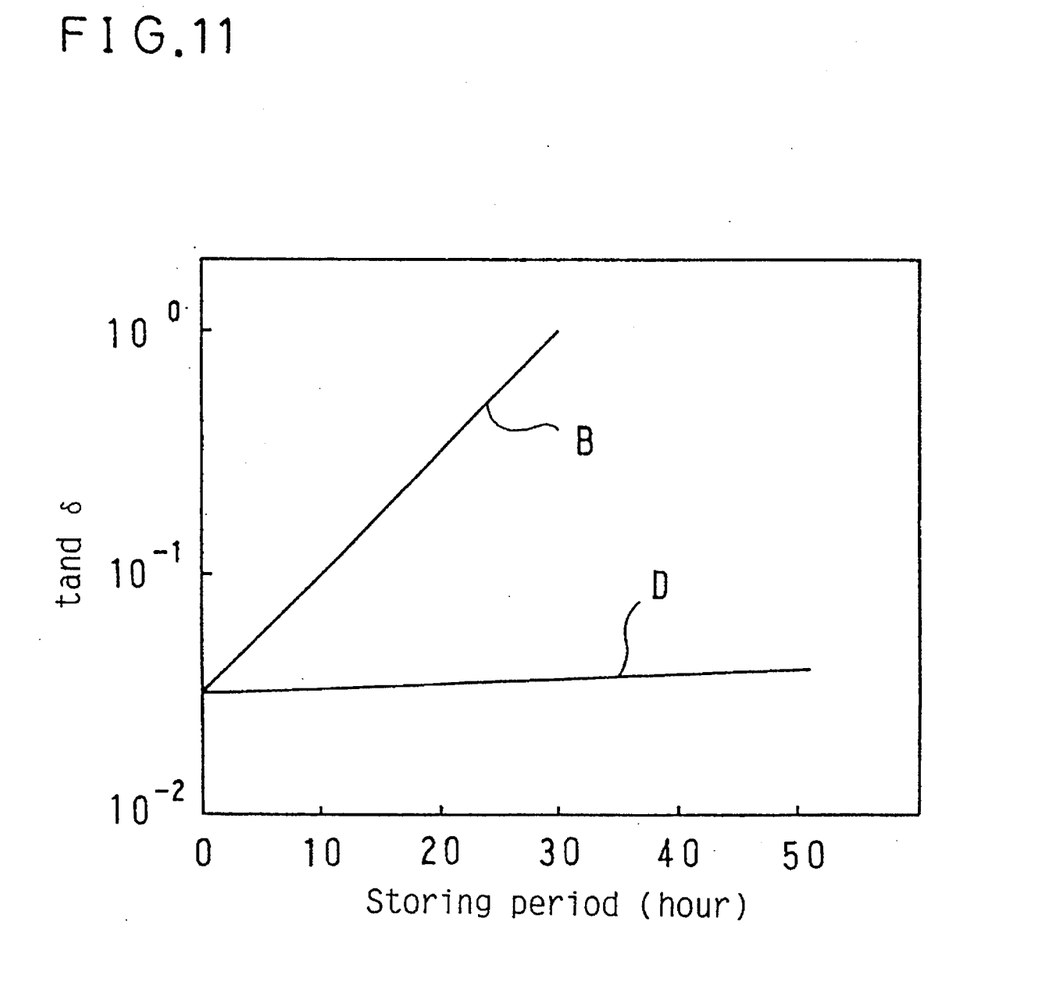
FIG.11 is a diagram showing changes in the tan δs of the capacitor elements of the embodiment and of a comparative example during storing.

The results of measurements on electrostatic capacitance, equivalent series resistance and tan δ (loss angle) as well as their changes by aging performed on the capacitor D and the capacitor B of the comparative example under the same conditions as those in Example 4 are shown in FIG. 9, FIG. 10 and FIG. 11, respectively.

As clearly shown by these figures, it is appreciated that the characteristics of capacitor element D configured with the electrolyte of the present invention have a sufficient reliability.

It is understood that various other modifications will be apparent to and can be readily made by those skilled in the art to which this invention pertains without departing from the scope and spirit of this invention. Accordingly, it is not intended that the scope of the claims appended hereto be limited to the description as set forth herein, but rather that the claims be construed as encompassing all the features that would be treated as equivalents thereof, by those skilled in the art to which this invention pertains.

What is claimed is:

1. An ion-conductive electrolyte comprising:

a polymer polymerized from a prepolymer which has a polyol skeletal structure including at least three polyalkylene oxide units and is represented by the general formula (1):

wherein
$R_1 = -O-\{(C_2H_4O)_{l_1}-(C_3H_6O)_{m_1}\}_{n_1}-$, $R_2 = -O-\{(C_2H_4O)_{l_2}-(C_3H_6O)_{m_2}\}_{n_2}-$, $R_3 = -O-\{(C_2H_4O)_{l_3}-(C_3H_6O)_{m_3}\}_{n_3}-$, $R_4 = -CH_2-O-\{(C_2H_4O)_{l_4}-(C_3H_6O)_{m_4}\}_{n_4}X$ and $l_1, m_1, n_1, l_2, m_2, n_2, l_3, m_3, n_3, l_4, m_4$ and $n_4$ are integers of 1 or larger, and X represents a terminal group having at least one double bond at which polymerization of the prepolymer is initiated, at least one ammonium salt or quaternary ammonium salt, and at least one organic solvent.

2. An ion-conductive electrolyte comprising:

a polymer polymerized from a prepolymer which has a polyglyceride skeletal structure including three polyalkylene oxide units and is represented by the general formula (2):

wherein $R_1 = -O-\{(C_2H_4O)_{l_1}-(C_3H_6O)_{m_1}\}_{n_1}-$, $R_2 = -O-\{(C_2H_4O)_{l_2}-(C_3H_6O)_{m_2}\}_{n_2}-$, $R_3 = -O-\{(C_2H_4O)_{l_3}-(C_3H_6O)_{m_3}\}_{n_3}-$, $l_1, m_1, n_1, l_2, m_2, n_2, l_3, m_3$ and $n_3$ are integers of 1 or larger, j represents an integer of 2 or larger, and X represents a terminal group having at least one double bond at which polymerization of the prepolymer is initiated, at least one ammonium salt or quaternary ammonium salt, and at least one organic solvent.

3. An ion-conductive polymer electrolyte in accordance with claim 1 or 2, wherein the ratio of the number of ethylene oxide units to the total number of ethylene oxide units and propylene oxide units in one branch of said polymer is 0.50 or more, and wherein the number of said ethylene oxide units in one branch is from 2 to 20.

4. An ion-conductive polymer electrolyte in accordance with claim 1 or 2, wherein said ammonium salt or quaternary ammonium salt is at least one member selected from the group consisting of an ammonium salt of a carboxylic acid, an ammonium salt of a dicarboxylic acid, a quaternary ammonium salt of a carboxylic acid and a quaternary ammonium salt of a dicarboxylic acid.

5. An ion-conductive polymer electrolyte in accordance with claim 1 or 2, wherein X in said general formula (1) in claim 1 or in said general formula (2) in claim 2 is an acryloyl group or a methacryloyl group.

6. An ion-conductive polymer electrolyte in accordance with claim 1 or 2, wherein said organic solvent is at least one member selected from the group consisting of ethylene glycol, diethylene glycol, triethylene glycol, and tetraethylene glycol.

7. An ion-conductive polymer electrolyte in accordance with claim 1 or 2, wherein said organic solvent is at least one member selected from the group consisting of triethylene glycol monomethylether and tetraethylene glycol monomethylether.

8. An ion-conductive polymer electrolyte in accordance with claim 1 or 2, wherein said organic solvent is at least one member selected from the group consisting of γ-butyrolactone, propylene carbonate, ethylene carbonate, sulfolane, N,N-dimethyl formamide, dimethyl sulfoxide and acetonitrile.

9. An electroltic capacitor comprising:

an aluminum positive electrode having a dielectric substance layer composed of aluminum oxide, an aluminum negative electrode, and an ion-conductive polymer electrolyte layer placed between said dielectric substance layer and said negative electrode, said electrolyte comprising:

a polymer polymerized from a prepolymer which has a polyol skeletal structure including at least three polyalkylene oxide units and is represented by the general formula (1):

(1)

wherein $R_1 = -O-\{(C_2H_4O)_{l_1}-(C_3H_6O)_{m_1}\}_{n_1}-$, $R_2 = -O-\{(C_2H_4O)_{l_2}-(C_3H_6O)_{m_2}\}_{n_2}-$, $R_3 = -O-\{(C_2H_4O)_{l_3}-(C_3H_6O)_{m_3}\}_{n_3}-$, $R_4 = -CH_2-O-\{(C_2H_4O)_{l_4}-(C_3H_6O)_{m_4}\}_{n_4}X$ and $l_1$, $m_1$, $n_1$, $l_2$, $m_2$, $n_2$, $l_3$, $m_3$, $n_3$, $l_4$, $m_4$ and $n_4$ are integers of 1 or larger, and X represents a terminal group having at least one double bond at which polymerization of the prepolymer is initiated, at least one ammonium salt or quaternary ammonium salt, and at least one organic solvent.

10. An electrolytic capacitor comprising:

an aluminum positive electrode having a dielectric substance layer composed of aluminum oxide, an aluminum negative electrode, and an ion-conductive polymer electrolyte layer placed between said dielectric substance layer and said negative electrode, said electrolyte comprising:

a polymer polymerized from a prepolymer which has a polyglyceride skeletal structure including three polyalkylene oxide units and is represented by the general formula (2):

(2)

wherein $R_1 = -O-\{(C_2H_4O)_{l_1}-(C_3H_6O)_{m_1}\}_{n_1}-$, $R_2 = -O-\{(C_2H_4O)_{l_2}-(C_3H_6O)_{m_2}\}_{n_2}-$, $R_3 = -O-\{(C_2H_4O)_{l_3}-(C_3H_6O)_{m_3}\}_{n_3}-$, $l_1$, $m_1$, $n_1$, $l_2$, $m_2$, $n_2$, $l_3$, $m_3$ and $n_3$ are integers of 1 or larger, j represents an integer of 2 or larger, and X represents a terminal group having at least one double bond at which polymerization of the prepolymer is initiated, at least one ammonium salt or quaternary ammonium salt, and at least one organic solvent.

11. An electrolytic capacitor in accordance with claim 9 or 10, wherein the ratio of the number of ethylene oxide units to the total number of ethylene oxide units and propylene oxide units in one branch of said polymer is 0.50 or more, and wherein the number of said ethylene oxide units in one branch is from 2 to 20.

* * * * *